(12) United States Patent
Vitanov et al.

(10) Patent No.: US 7,941,452 B2
(45) Date of Patent: *May 10, 2011

(54) APPARATUS AND METHOD FOR EFFICIENT ENCODING OF APPLICATION DEFINITION USING CONTIGUOUS ARRAYS

(75) Inventors: Kamen Vitanov, Mississauga (CA); Michael Shenfield, Richmond Hill (CA); Laura Doktorova, Mississauga (CA); Richard X. Qing, Ottawa (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/787,848

(22) Filed: May 26, 2010

(65) Prior Publication Data

US 2010/0235399 A1 Sep. 16, 2010

Related U.S. Application Data

(63) Continuation of application No. 11/106,574, filed on Apr. 15, 2005, now Pat. No. 7,730,103.

(51) Int. Cl.
*G06F 7/00* (2006.01)
*G06F 17/30* (2006.01)

(52) U.S. Cl. ........................ 707/801; 707/802

(58) Field of Classification Search .................. 707/763, 707/801, 802, 999.102, 999.103, 999.104, 707/999.105, 999.106

See application file for complete search history.

(56) References Cited

U.S. PATENT DOCUMENTS

| 5,179,660 | A | 1/1993 | Devany et al. |
|---|---|---|---|
| 5,729,681 | A | 3/1998 | Aditya et al. |
| 5,892,925 | A | 4/1999 | Aditya et al. |
| 5,893,125 | A | 4/1999 | Shostak |
| 6,230,157 | B1 * | 5/2001 | Malcolm et al. ............. 707/809 |
| 6,324,680 | B1 | 11/2001 | Barnfield et al. |
| 6,745,286 | B2 | 6/2004 | Staub et al. |
| 2002/0065810 | A1 | 5/2002 | Bradley |
| 2004/0167937 | A1 | 8/2004 | Sirois et al. |

OTHER PUBLICATIONS

Sirken M. et al: "Software components in a data structure precompiler", Software Engineering, 1993, Proceedings., 15th International Conference of Baltimore, MD, US May 17-21, 1993, Los Alamitos, CA, USA, IEEE Comput. Soc., May 17, 1993, pp. 437-446, XP010095594 ISBN. 0-8186-3700-5 *the whole document*.*
Eisenhauer G. et al: "Fast heterogeneous binary data interchange", Heterogeneous Computing Workshop, 2000, (HCW 2000), Proceedings, 9th Cancun, Mexico, May 1, 2000, Los Alamitos, CA, USA, IEEE Comput. Soc., US, 2000, pp. 90-101, XP010500481 ISB:. 0-7695-0556-2, *the whole document*.*
Somers, Marc S., USPTO Office Communication dated May 21, 2008 in relation to U.S. Appl. No. 11/106,574, filed Apr. 15, 2005.
Somers, Marc S., USPTO Office Communication dated Oct. 24, 2008 in relation to U.S. Appl. No. 11/106,574, filed Apr. 15, 2005.
Somers, Marc S., USPTO Office Communication dated Jan. 2, 2009 in relation to U.S. Appl. No. 11/106,574, filed Apr. 15, 2005.

(Continued)

*Primary Examiner* — James Trujillo
*Assistant Examiner* — Marc Somers

(57) ABSTRACT

A system and method for the simplification of data structures, particularly those used for wireless communications, encodes data structures for efficient storage and access. Wireless devices are provisioned with user applications for accessing remote services, such as World Wide Web services. The user applications comprise a plurality of component definitions which typically describe complex data structures for execution by a runtime environment. The runtime environment is conditioned to use a manner to encode such data structures in flat arrays of primitive types.

12 Claims, 4 Drawing Sheets

OTHER PUBLICATIONS

Somers, Marc S., USPTO Office Communication dated Mar. 10, 2009 in relation to U.S. Appl. No. 11/106,574, filed Apr. 15, 2005.
Somers, Marc S., USPTO Office Communication dated Sep. 23, 2009 in relation to U.S. Appl. No. 11/106,574, filed Apr. 15, 2005.

Somers, Marc S., USPTO Office Communication dated Dec. 4, 2009 in relation to U.S. Appl. No. 11/106,574, filed Apr. 15, 2005.
Somers, Marc S., USPTO Office Communication dated Jan. 19, 2010 in relation to U.S. Appl. No. 11/106,574, filed Apr. 15, 2005.

* cited by examiner

APPARATUS AND METHOD FOR EFFICIENT ENCODING OF APPLICATION DEFINITION USING CONTIGUOUS ARRAYS

CROSS-REFERENCE TO RELATED APPLICATION

This application is a continuation of application Ser. No. 11/106,574 filed Apr. 15, 2005, the contents of which are hereby incorporated by reference.

TECHNICAL FIELD

This application relates generally to wireless communications and wireless communications devices and, in particular, to a method and apparatus for the efficient encoding of an application definition using contiguous arrays.

BACKGROUND OF THE INVENTION

The acceptance of wireless devices as a preferred personal communications medium has created a growing demand for such devices. Users of such devices also increasingly expect more functionality and a broader range of services to be made available through such devices. Not only is there a demand for more functionality, there is also a demand for faster response times and more efficient access to remote services.

A major challenge is faced in exposing wireless devices to complex data sources, such as web services, due to the size and complexity of the data structures communicated from such sources. In wired networks and devices where resources and efficiency are not a significant concern, it is permissible to transmit, process and store large and complex data structures.

Complex data structures containing many objects and levels of nesting introduce a significant memory overhead on wireless devices. This impacts performance when storing to and retrieving from a memory store.

Consequently, what is desired is a method and apparatus to efficiently encode complex data structures of an application definition.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

A system and method for the simplification of data structures, particularly those used for wireless communications is provided. Wireless devices are provisioned with user applications for accessing remote services, such as World Wide Web services. The user applications comprise a plurality of component definitions which typically describe complex data structures for execution by a runtime environment. The runtime environment is conditioned to use a manner to encode such data structures in flat arrays of primitive types.

The system method and data structure seek to promote efficient data storage, efficient data storage and retrieval, and transparent, efficient wireless messaging between wireless devices and remote services, such as World Wide Web services.

System Overview

Figure 1:
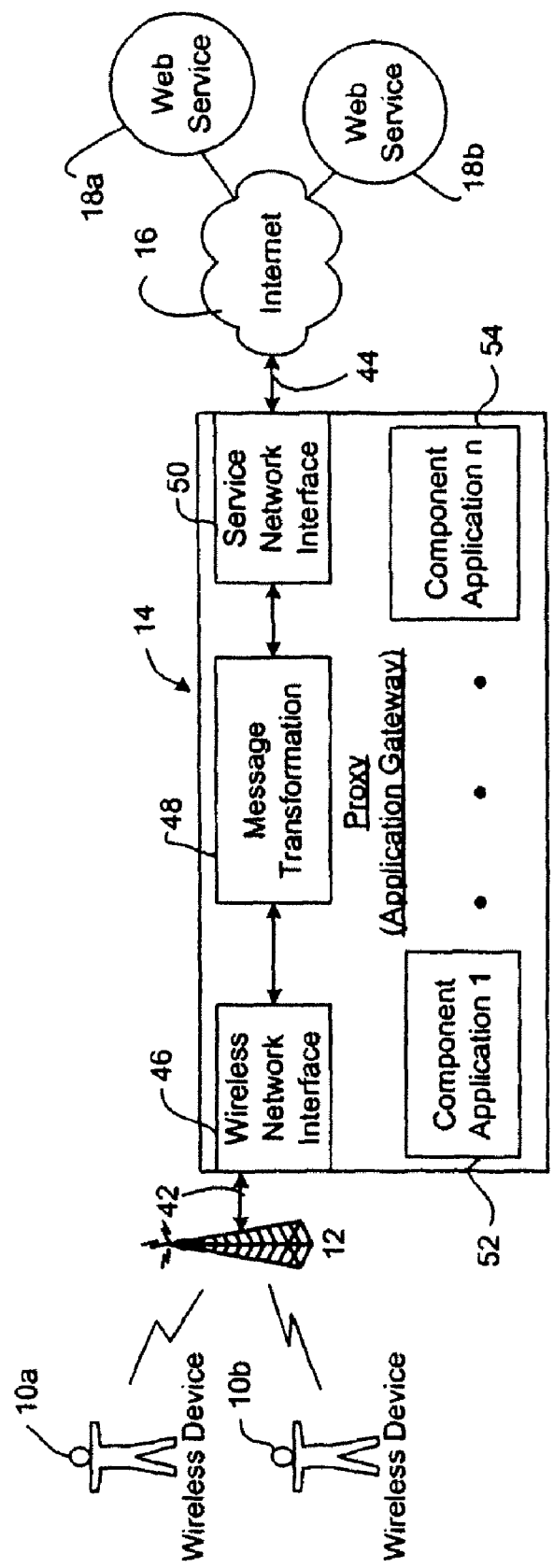
FIG. 1 is a block diagram of a network system including wireless devices and a proxy in accordance with an embodiment of the invention.

FIG. 1 is a block diagram of a network in which wireless device users 10a, 10b operate wireless devices to send web service request messages via a public domain carrier 12 to a stateful proxy which in one embodiment is an application gateway 14. The application gateway 14 forwards the web service request messages through a service network such as the Internet 16 to an appropriate web service 18a, 18b. The messages are processed by the appropriate web service 18a, 18b and returned through the Internet 16 to the application gateway 14. The public domain carrier 12 forwards the response messages to the wireless device 10a, 10b which processes the response and displays, as applicable, response content to the wireless device users 10a, 10b.

The application gateway 14 supports a wireless network interface 46 having a link 42 to the wireless network 12. A message transformation function 48 receives messages from the wireless network interface 46 and processes the messages before forwarding the messages to a service network interface 50. The service network interface 50 has a link 44 to the service network 16 (the Internet, for example) over which it forwards the messages to an appropriate web service(s).

In accordance with an embodiment of the invention, the application gateway 14 is provisioned with a plurality of component-based applications 52, 54 which configure the gateway 14 for processing the various messages. Gateway 14 may also provision the wireless devices 10a and 10b with portions of the component-based applications 52, 54 to enable the devices 10a and 10b to access the web services 18a and 18b via the gateway 14.

Figure 2:
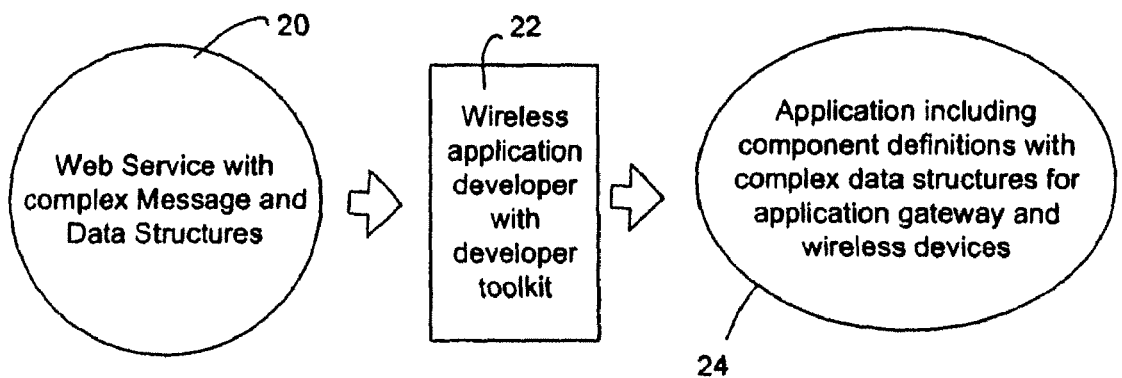
FIG. 2 is a schematic diagram illustrating a process for creating and enabling a system in accordance with an embodiment of the invention.

With reference to FIG. 2, a wireless application developer 22 uses a specification of a web service 20 and an application developer toolkit to create component-based applications 24 (of which component applications 52 and 54 are examples) including component definitions, mappings, and other artifacts for enabling a system in accordance with an embodiment of the invention. These applications 24 are used by the application gateway 14 and wireless devices 10a and 10b to make and process service request and service response messages. For example, mappings from application 24 may comprise message mappings for gateway 14 to define a relationship in content between messages over link 42 and messages over link 44. Component definitions from application 24 may define various types of components for configuring the operations of wireless devices 10a and 10b including, but not limited to, data, user interface, control, message and function components. Such definitions are typically expressed in a structured definition language such as eXtensible Mark-up Language (XML).

Figure 3:
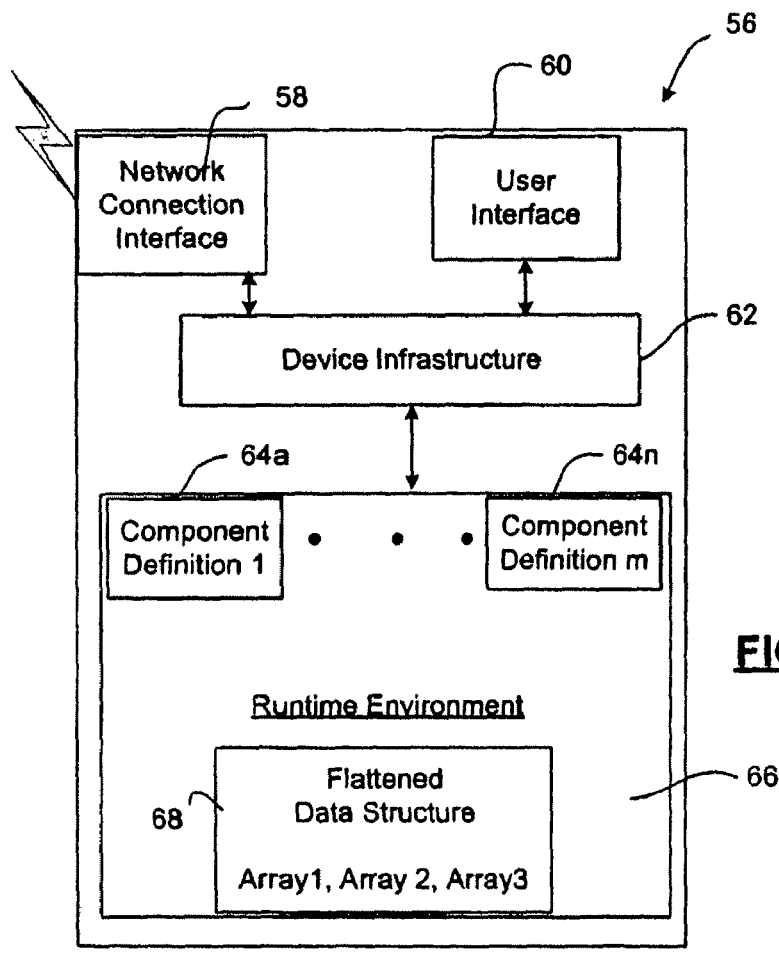
FIG. 3 is a block diagram of a wireless device in accordance with an embodiment of the invention.

FIG. 3 is a block diagram of a wireless device 56 in accordance with an embodiment of the invention. The wireless device 56 includes a network connection interface 58 that is well known in the art and used to communicate wirelessly with the public domain carrier 12. The wireless device 56 further includes a user interface 60, which may be a keypad, a touch sensitive screen, voice recognition software, or any other user interface for wireless devices. A device infrastructure 62 includes memory, processor(s), peripheral ports, keypad, display and other hardware components required to support the functionality of the wireless device 56.

A runtime environment 66 provides basic resources and services and executes applications defined by the component definitions 64a-64m and other artifacts 24. The runtime environment may be configured as an intelligent container. Component definitions 64a-64n typically uses complex data structures containing many objects and levels of nesting. Processing these structures in a wireless device can entail significant memory and processing resources which may impact on the user experience. In accordance with an embodiment of the invention as will be explained below with reference to FIG. 5, runtime environment 66 simplifies the complex data structures by "flattening" into arrays of primitive types. These types may include byte, int, long, String, etc. types for Java™-based programming languages.

Figure 4:
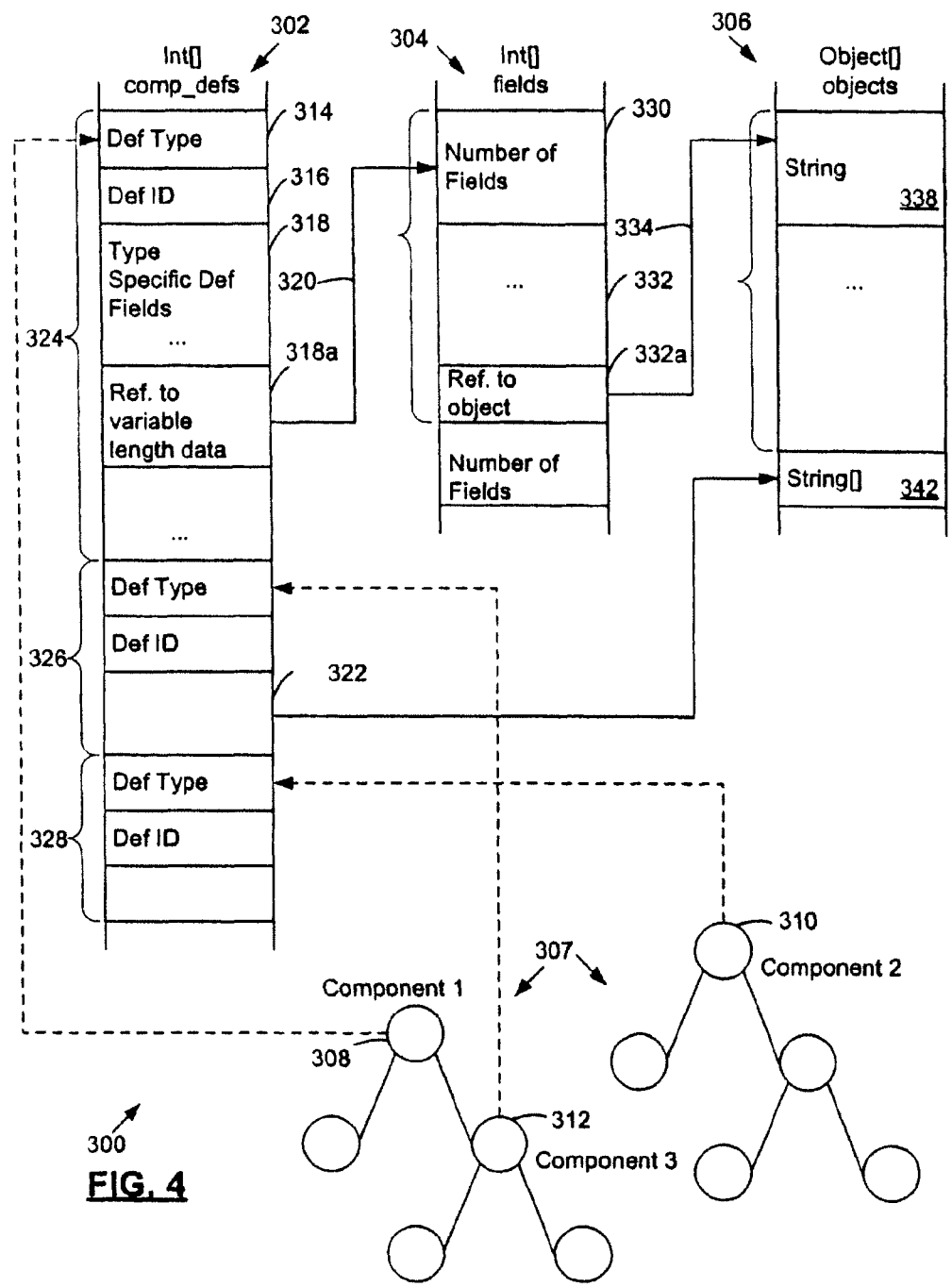
FIG. 4 is a schematic representation of a representation of a complex data structure after it has been simplified using operations shown in FIG. 5.

FIG. 4 is a schematic representation of arrays 300 for providing a runtime implementation of complex data structures 307. Arrays 300 comprise a first array 302 of primitive type integer (int), a second array 304 of primitive type int and a third array 306 of type objects. By using these three arrays 302, 304 and 306, any hierarchical data structure can be represented in a flattened and reference-based fashion to facilitate a more compact runtime representation than the traditional object-based component definition runtime representation. Arrays 302 and 304 are shown as integer types but persons of ordinary skill in the art will appreciate that a minimum size of entry is not necessary to be the size of integer (or 32 bits in many runtime systems) as a byte, for example, can be used to represent a set of properties of a component type.

The first array 302, or comp_defs provides the structural description of application components, which contains the following information for each application component:

DefType: One of the common properties of component definition representation is the DefType 314 which represents the type of the component. As noted earlier, various component types may be defined for the runtime environment and the types of components usually include but are not limited to, Data, UI Control, Message and Functions. The portion of array 302 utilized representing a size of a definition (indicated by reference 324 for component 1 308, by 326 for component 3 312 and 328 for component 2 310) for different types are likely different, for each component type would likely have its own specific definition fields (i.e. TypeSpecificDefFields 318).

DefID: Another of the common properties of the component definition representation is the DefID 316 which represents the ID of component. DefType and DefID together identify a definition of component, i.e., a particular DefID itself cannot identify a definition among all types of component definitions, but its value should be unique in the group of component definitions that have the same definition type.

TypeSpecificDefFields: These fields 318 are used to identify the specific features of a definition of a specific component type. For example though not shown, a Data component of an application could have a field (integer or byte) to indicate if a data definition has a primary key and, if it has, the index of that primary key field of data. Another example, which is shown in FIG. 4, is a definition field 318a which contains an index that refers to the fields array 304 where fields are defined. Definition field 318a may indicate that the data component does not have any data fields with a value of −1.

It is noted that all component definitions having the same DefType are represented by the same portion of comp_defs array 302.

The second array 304, or fields describes the properties of component fields, such as number of fields 330, field type that can be either a primitive type or data component, runtime properties of field such as if it has default value. For example property 332 references a default value using a pointer to objects array 306. Again, different types of components would have different properties and therefore, the amount of bytes of fields array 304 taken by this portion of a definition may differ.

The third array 306, or objects provides a place to store external objects that are taken as atomic elements in a component definition. For example, a String object 338, 342 that is referred by a component definition (e.g. 308) as a default value of a field could be stored in the objects array 306. In summary, a hierarchical component definition is flattened into three compact arrays: e.g. two integer-type arrays and one object array. One type of component definition (e.g. Data) would have its own separate set of these three arrays from another type of component definition (e.g. Message). By doing this, runtime memory used by component definition representation is dramatically decreased.

Figure 5:
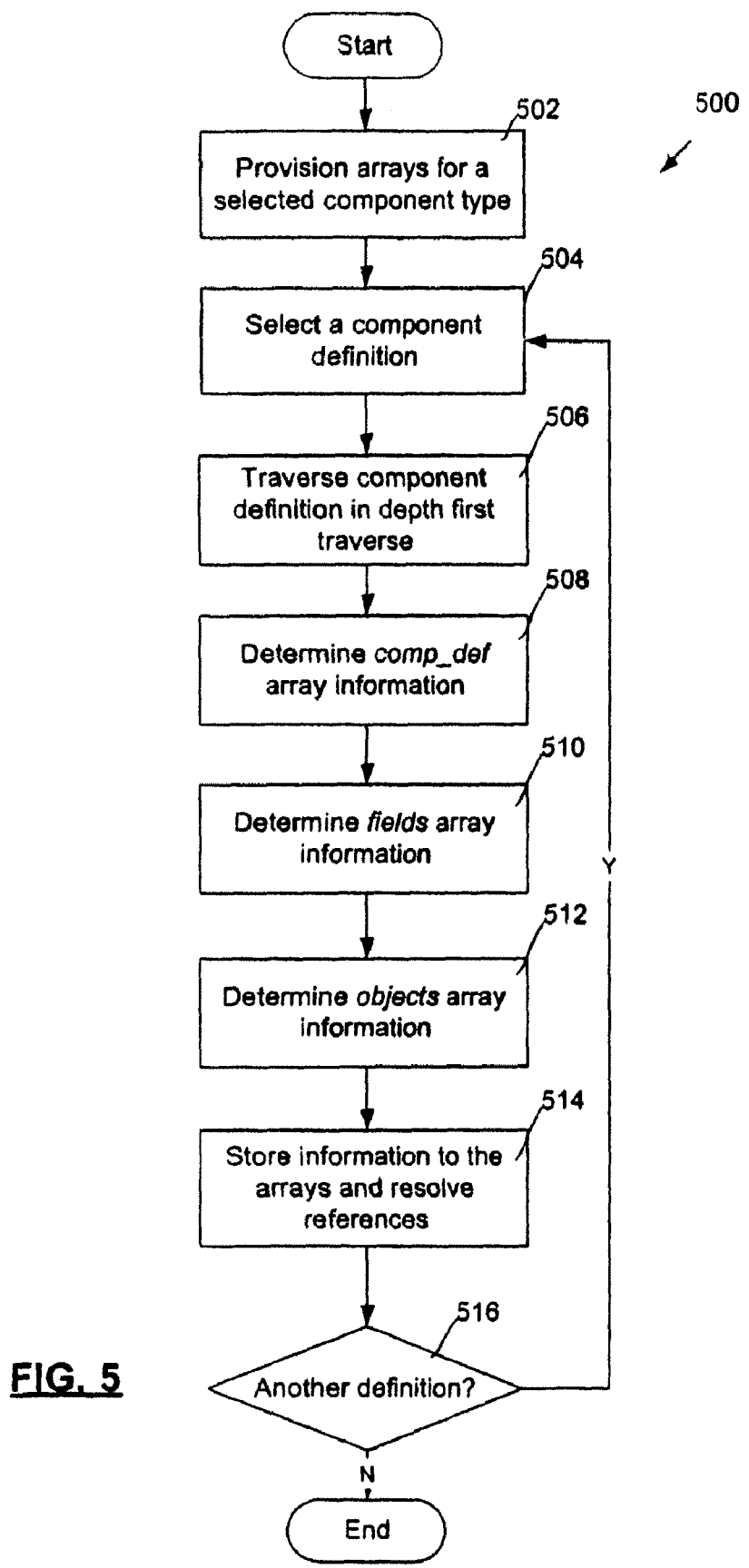
FIG. 5 is a flow chart of operations in accordance with an embodiment of the invention for flattening complex data structures in contiguous arrays.

FIG. 5 illustrates a flow chart of operations 500 in accordance with an embodiment of the invention and embodied in computer executable code for a runtime environment to simplify a complex data structure definition, flattening the structure into three arrays (e.g. 302-306) as discussed. Operations for flattening component definitions of a single selected component type (e.g. data) are illustrated. At step 502 instances of the three arrays 302-306 are provisioned and at step 504 a specific data component definition is selected. The definition is traversed in depth first traverse and parsed to glean the required information. At steps 508, 510 and 512 information for each of the comp_def, fields and objects arrays 302-306 is determined. For example, a DefID 316 is generated for this instance of the particular DefType 314. TypeSpecificDefFields 318 are determined (including provisioning an index 318a to the fields array 304 for subsequent resolving as necessary). Particular field information 332 for the fields array is determined and a count of the number of fields 330 is determined. Objects (e.g. 338) are determined for the objects array 306. At step 514, the arrays 302-304 can be populated with the determined information and appropriate references resolved (e.g. the index from comp_deftofields, a particular field's default value reference index 332a to objects, etc.).

Sequential representation of a component definition within the arrays 302-306 means that the information for a subsequent definition is stored into the arrays 302-306 after all the information for the current definition is stored. At step 516 a determination is made whether another definition is available for simplifying. If so, operations 500 may loop to step 504. Otherwise they end.

References or relationships within a definition are represented in the flat array structure 300. The aggregation or "has" relationship within one component definition (e.g. one component has 3 fields, a, b and c) is represented as a reference-to relationship between the three arrays. There are four kinds of reference-to relationships:

comp_defs-to-fields: A component is composed of fields. A field definition is represented in fields array 304; to refer to the definitions of fields that the component has, comp_def array 302 keeps an index 320 at an entry 318a of the array 302 to the fields array 304 where its field definitions start (e.g. 330). For example, a data component A has 6 fields; the definition for each field takes 3 integers.

comp_defs-to-objects: comp_defs 302 can also refer to objects 306. For example, to represent an enumeration data type "Color", which defines three enumeration values, "Red", "Green", "Blue" the high level description of "Color" (e.g. Component 3 in FIG. 4) is placed in comp_defs 322, then its values (field values) in objects 306 as a String[ ] object 342.

fields-to-objects: A field of a component could have a default value—in this case, the field definition (e.g. 332*a*) in fields 304 may just contain an index 334 to the default value 338 in objects array 306.

fields-to-comp: A field could be of type data component-in this case the file definition in fields would contain the DefID of that data component, which can be used to uniquely identify that data component's definition (example not shown).

The flat array structure proposed may be useful both during runtime for executing the application and for persisting data in accordance with the data structures defined by the component definitions. As will be appreciated by those skilled in the art, the invention allows application developers to improve wireless device performance by reducing data processing overheads. It also allows application developers to reduce storage space requirements on the wireless devices 10*a*, 10*b* by reducing space-consuming complex data structures.

Although the invention has been explained with explicit reference to web services, those skilled in the art will appreciate that the invention can be used to efficiently access any remote service.

The embodiment(s) of the invention described above is (are) intended to be exemplary only. The scope of the invention is therefore intended to be limited solely by the scope of the appended claims.

We claim:

1. A wireless device for simplifying the representation of an application component defined by a component definition using a complex data structure, the wireless device comprising:
    a runtime environment for executing applications comprising component definitions, the runtime environment comprising computer executable code that, upon execution: accepts as input a component definition defining a component of an application, the component definition using a complex data structure containing multiple levels of nesting and multiple objects; and defines a simplified data structure comprising three arrays to represent the complex data structure, wherein the three arrays comprise:
        a first array of primitive types storing structural description information regarding said component,
        a second array of primitive types storing properties of each field of said component, and
        a third array storing objects representing default values of each said field of said component,
    and wherein the computer executable code associates the arrays to provide references between the arrays by:
        setting an index within the first array to indicate where field definitions of said component start within the second array; and
        setting a further index within the second array to reference an object in the third array indicative of a default value of one of said component fields.

2. The wireless device as claimed in claim 1 wherein the computer executable code uses said simplified data structure while executing an application defined by the component definition and while persisting the component described by the component definition.

3. The wireless device as claimed in claim 1 wherein the computer executable code traverses the component definition in depth first traverse order to sequentially define the simplified data structure for the component definitions within the arrays.

4. The wireless device as claimed in claim 1 wherein the structural description information comprises a definition type and a definition identifier to distinguish a particular simplified data structure among those having a common definition type.

5. The wireless device as claimed in claim 1 wherein said primitive types comprise at least one of: byte, integer, long, and String.

6. A method for simplifying the representation of an application component described by a component definition using a complex data structure, the method comprising:
    provisioning a runtime environment which executes applications comprising component definitions with computer executable code that, upon execution: accepts as input a component definition defining a component of an application, the component definition using a complex data structure containing multiple levels of nesting and multiple objects; and defines a simplified data structure comprising three arrays to represent the complex data structure,
    wherein the three arrays comprise:
        a first array of primitive types storing structural description information regarding said component;
        a second array of primitive types storing properties of each field of said component; and
        a third array storing objects representing default values of each said field of said component,
    and wherein the computer executable code associates the arrays to provide references between the arrays by:
        setting an index within the first array to indicate where field definitions of said component start within the second array; and
        setting a further index within the second array to reference an object in the third array indicative of a default value of one of said component fields.

7. The method as claimed in claim 6 wherein the computer executable code uses said simplified data structure while executing an application defined by the component definition and while persisting the component described by the component definition.

8. The method as claimed in claim 6 wherein the computer executable code traverses the component definition in depth first traverse order to sequentially define the simplified data structure for the component definitions within the arrays.

9. The method as claimed in claim 6 wherein said primitive types comprise at least one of: byte, integer, long, and String.

10. A memory for storing data for access by a runtime environment for executing on a data processing device an application comprising a component definition defining a component of an application, the component definition using a complex data structure containing multiple levels of nesting and multiple objects, comprising:
    a data structure stored in said memory, said data structure comprising three arrays for representing the complex data structure, the three arrays comprising:
        a first array of primitive types for storing structural description information regarding said component,
        a second array of primitive types storing properties of each field of said component, and
        a third array storing objects representing default values of each said field of said component;

said first array including an index indicating where field definitions of said component start within said second array; and said second array including a further index referencing an object in said third array indicative of a default value of one of said component fields.

11. The memory as claimed in claim 10 wherein the structural description information comprises a definition type and a definition identifier to distinguish a particular simplified data structure among those having a common definition type.

12. The memory as claimed in claim 10 wherein said primitive types comprise at least one of: byte, integer, long, and String.

* * * * *